United States Patent
Peuhkurinen et al.

(10) Patent No.: US 11,488,345 B2
(45) Date of Patent: Nov. 1, 2022

(54) DISPLAY APPARATUSES AND RENDERING SERVERS INCORPORATING PRIORITIZED RE-RENDERING

(71) Applicant: Varjo Technologies Oy, Helsinki (FI)

(72) Inventors: Ari Antti Peuhkurinen, Helsinki (FI); Ville Miettinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 15 days.

(21) Appl. No.: 17/077,531

(22) Filed: Oct. 22, 2020

(65) Prior Publication Data
US 2022/0130103 A1   Apr. 28, 2022

(51) Int. Cl.
| | |
|---|---|
| *G06T 15/00* | (2011.01) |
| *G06T 15/20* | (2011.01) |
| *H04N 13/344* | (2018.01) |
| *H04N 13/111* | (2018.01) |
| *H04N 13/366* | (2018.01) |
| *H04L 67/131* | (2022.01) |
| *H04L 67/12* | (2022.01) |

(52) U.S. Cl.
CPC ............ *G06T 15/20* (2013.01); *H04L 67/131* (2022.05); *H04N 13/111* (2018.05); *H04N 13/344* (2018.05); *H04N 13/366* (2018.05); *G06T 2210/36* (2013.01); *H04L 67/12* (2013.01)

(58) Field of Classification Search
USPC ........................................................ 345/418
See application file for complete search history.

(56) References Cited

U.S. PATENT DOCUMENTS

| | | | |
|---|---|---|---|
| 10,379,611 B2* | 8/2019 | Akenine-Moller | G06F 3/012 |
| 10,545,338 B2 | 1/2020 | Stafford et al. | |
| 11,099,381 B2* | 8/2021 | Peuhkurinen | G02B 27/0093 |
| 11,163,159 B1* | 11/2021 | Rong | G06T 7/50 |

(Continued)

OTHER PUBLICATIONS

Notification of Transmittal of the International Search Report and the Written Opinion of the International Searching authority, or the Declaration, Application No. PCT/FI2021/050605, dated Nov. 8, 2021, 19 pages.

*Primary Examiner* — Phu K Nguyen
(74) *Attorney, Agent, or Firm* — Ziegler IP Law Group, LLC

(57) ABSTRACT

A display apparatus including means for tracking pose of user's head, light source(s) and processor configured to: process pose-tracking data to determine position, orientation, velocity and acceleration of head; predict viewpoint and view direction of user in extended-reality environment; determine region of extended-reality environment to be presented, based on viewpoint and view direction; determine sub-region(s) of region whose rendering information is to be derived from previous rendering information of corresponding sub-region(s) of previously-presented region of extended-reality environment; generate rendering information of sub-region(s) based on previous rendering information; send, to rendering server, information indicating remaining sub-regions required to be re-rendered and pose information indicating viewpoint and view direction; receive, from rendering server, rendering information of remaining sub-regions; merge rendering information of sub-region(s) and rendering information of remaining sub-regions to generate image(s); and display image(s) via light source(s).

14 Claims, 3 Drawing Sheets

(56) References Cited

U.S. PATENT DOCUMENTS

| | | |
|---|---|---|
| 11,321,906 B2 * | 5/2022 | Melkote Krishnaprasad ............... G06V 10/25 |
| 2018/0081429 A1 | 3/2018 | Akenine-Moller et al. |
| 2018/0284451 A1 * | 10/2018 | Eash ........................ G06F 3/016 |
| 2020/0005719 A1 * | 1/2020 | Martin ..................... G06F 3/012 |
| 2020/0049946 A1 * | 2/2020 | Peuhkurinen ........... G06F 3/013 |
| 2020/0264701 A1 | 8/2020 | Tokubo et al. |
| 2021/0278678 A1 * | 9/2021 | Brannan ............ G02B 27/0093 |
| 2021/0350630 A1 * | 11/2021 | Petrovskaya ......... G06F 3/0308 |
| 2022/0026715 A1 * | 1/2022 | Wang ................ G02B 27/0093 |

* cited by examiner

DISPLAY APPARATUSES AND RENDERING SERVERS INCORPORATING PRIORITIZED RE-RENDERING

TECHNICAL FIELD

The present disclosure relates to display apparatuses and rendering servers incorporating prioritized re-rendering. Moreover, the present disclosure relates to methods of displaying that are implemented by such display apparatuses.

BACKGROUND

Use of display apparatuses to experience interactive extended-reality (XR) environments is increasingly becoming popular. An XR environment could be a virtual reality (VR) environment, an augmented reality (AR) environment, a mixed reality (MR) environment, and the like. Moreover, generally, the XR environment is three-dimensional (3D) in nature. Typically, the display apparatuses include rendering servers that generate rendering information of the XR environment, and head-mounted devices (HMDs) at which images corresponding to the XR environment are displayed using the rendering information. A user wears an HMD on his/her head for viewing these images to experience the XR environment. As an example, a rendering server generates a 3D representation of a VR shooting game that is mapped to at least two displays of the HMD to provide the user with a 3D view of the VR shooting game using stereoscopy technique.

Nowadays, the display apparatuses are also employing pose-tracking of the user's head, to present realistic views of the XR environment to the user. While using a display apparatus, the user moves his/her head for viewing the XR environment from various viewpoints and view directions. As an example, the pose of the user's head may change in a manner that a region of the XR environment that is being viewed changes, a previously occluded (namely, hidden) object becomes visible, and the like.

However, existing display apparatuses suffer from several limitations. Firstly, complex 3D XR environments typically include one or more of moving objects, state-changing objects, complex lighting, textures, materials, and the like. Therefore, generating the rendering information of such complex 3D XR environments is a computationally heavy and time-consuming task. This causes excessive processing burden on the rendering server, especially when the images are required to be displayed at high frame rates for providing a visually pleasing XR environment to the user. When generating the rendering information, the rendering server also consumes a considerable amount of power. Secondly, when employing the pose-tracking of the user's head, the rendering server is required to dynamically generate the rendering information for the images in a manner that each image is consistent with a latest pose of the user's head. As a result, the processing burden on the rendering server is increased considerably. Overburdening of the rendering server is detrimental to usability and reliability of the display apparatus, and adversely impacts the user's viewing experience of the XR environment.

Therefore, in light of the foregoing discussion, there exists a need to overcome the aforementioned drawbacks associated with existing display apparatuses for presenting XR environments to users.

SUMMARY

The present disclosure seeks to provide a display apparatus incorporating prioritized re-rendering. The present disclosure also seeks to provide a method of displaying that is implemented by such a display apparatus. An aim of the present disclosure is to provide a solution that overcomes at least partially the problems encountered in prior art.

In one aspect, an embodiment of the present disclosure provides a display apparatus comprising:
  means for tracking a pose of a user's head;
  at least one light source per eye; and
  at least one processor configured to:
  process pose-tracking data, collected by said means, to determine a position, an orientation, a velocity and an acceleration of the user's head;
  predict a viewpoint and a view direction of the user in an extended-reality environment, based on the position, the orientation, the velocity and the acceleration of the user's head;
  determine a region of the extended-reality environment that is to be presented to the user, based on the predicted viewpoint and the predicted view direction of the user;
  determine at least one sub-region of the region to be presented whose rendering information is to be derived from previous rendering information of at least one corresponding sub-region of at least one previously-presented region of the extended-reality environment;
  generate the rendering information of the at least one sub-region based on the previous rendering information;
  send, to a rendering server, information indicative of remaining sub-regions of the region to be presented that are required to be re-rendered and pose information indicative of the predicted viewpoint and the predicted view direction of the user;
  receive, from the rendering server, rendering information of the remaining sub-regions of the region to be presented;
  merge the rendering information of the at least one sub-region and the rendering information of the remaining sub-regions to generate at least one image; and
  display the at least one image via the at least one light source.

In another aspect, an embodiment of the present disclosure provides a method of displaying, the method being implemented via a display apparatus comprising means for tracking a pose of a user's head and at least one light source per eye, the method comprising:
  processing pose-tracking data, collected by said means, to determine a position, an orientation, a velocity and an acceleration of the user's head;
  predicting a viewpoint and a view direction of the user in an extended-reality environment, based on the position, the orientation, the velocity and the acceleration of the user's head;
  determining a region of the extended-reality environment that is to be presented to the user, based on the predicted viewpoint and the predicted view direction of the user;
  determining at least one sub-region of the region to be presented whose rendering information is to be derived from previous rendering information of at least one corresponding sub-region of at least one previously-presented region of the extended-reality environment;
  generating the rendering information of the at least one sub-region based on the previous rendering information;

sending, to a rendering server, information indicative of remaining sub-regions of the region to be presented that are required to be re-rendered and pose information indicative of the predicted viewpoint and the predicted view direction of the user;

receiving, from the rendering server, rendering information of the remaining sub-regions of the region to be presented;

merging the rendering information of the at least one sub-region and the rendering information of the remaining sub-regions to generate at least one image; and displaying the at least one image via the at least one light source.

Embodiments of the present disclosure substantially eliminate or at least partially address the aforementioned problems in the prior art, and enable efficient sharing of rendering burden between the at least one processor and the rendering server by incorporating prioritized re-rendering of selected sub-regions, thereby avoiding overburdening of the rendering server.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
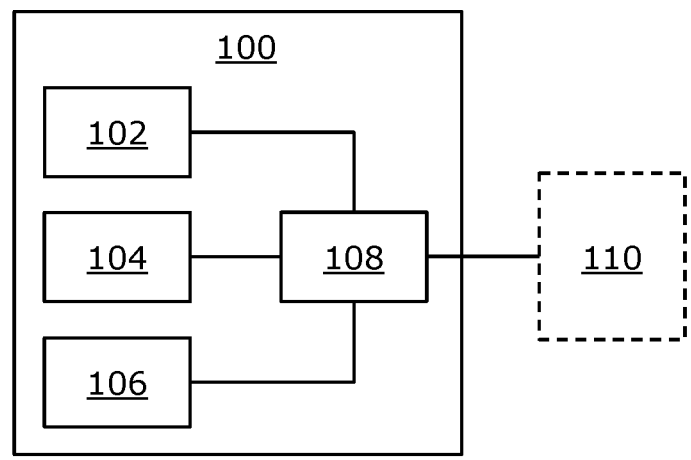
FIGS. 1 and 2 illustrate block diagrams of architectures of a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:
  means for tracking a pose of a user's head;
  at least one light source per eye; and
  at least one processor configured to:
    process pose-tracking data, collected by said means, to determine a position, an orientation, a velocity and an acceleration of the user's head;
    predict a viewpoint and a view direction of the user in an extended-reality environment, based on the position, the orientation, the velocity and the acceleration of the user's head;
    determine a region of the extended-reality environment that is to be presented to the user, based on the predicted viewpoint and the predicted view direction of the user;
    determine at least one sub-region of the region to be presented whose rendering information is to be derived from previous rendering information of at least one corresponding sub-region of at least one previously-presented region of the extended-reality environment;
    generate the rendering information of the at least one sub-region based on the previous rendering information;
    send, to a rendering server, information indicative of remaining sub-regions of the region to be presented that are required to be re-rendered and pose information indicative of the predicted viewpoint and the predicted view direction of the user;
    receive, from the rendering server, rendering information of the remaining sub-regions of the region to be presented;
    merge the rendering information of the at least one sub-region and the rendering information of the remaining sub-regions to generate at least one image; and
    display the at least one image via the at least one light source.

In another aspect, an embodiment of the present disclosure provides a method of displaying, the method being implemented via a display apparatus comprising means for tracking a pose of a user's head and at least one light source per eye, the method comprising:
  processing pose-tracking data, collected by said means, to determine a position, an orientation, a velocity and an acceleration of the user's head;
  predicting a viewpoint and a view direction of the user in an extended-reality environment, based on the position, the orientation, the velocity and the acceleration of the user's head;
  determining a region of the extended-reality environment that is to be presented to the user, based on the predicted viewpoint and the predicted view direction of the user;
  determining at least one sub-region of the region to be presented whose rendering information is to be derived from previous rendering information of at least one corresponding sub-region of at least one previously-presented region of the extended-reality environment;
  generating the rendering information of the at least one sub-region based on the previous rendering information;
  sending, to a rendering server, information indicative of remaining sub-regions of the region to be presented that are required to be re-rendered and pose information indicative of the predicted viewpoint and the predicted view direction of the user;

receiving, from the rendering server, rendering information of the remaining sub-regions of the region to be presented;

merging the rendering information of the at least one sub-region and the rendering information of the remaining sub-regions to generate at least one image; and displaying the at least one image via the at least one light source.

The display apparatus and the rendering server incorporate prioritized re-rendering in order to reduce a processing burden on the rendering server. Instead of re-rendering an entirety of the region to be presented using the rendering server, the display apparatus employs sharing of rendering workload between the at least one processor and the rendering server. The at least one processor efficiently utilizes the previous rendering information to derive the rendering information of the at least one sub-region of the region, whereas the rendering server re-renders the remaining sub-regions of the region according to the pose information.

Throughout the present disclosure, the term "display apparatus" refers to a system that is configured to present an extended-reality (XR) environment to the user when the display apparatus in operation is used by the user. Herein, the term "extended-reality" encompasses virtual reality (VR), augmented reality (AR), mixed reality (MR), and the like.

In one implementation, the display apparatus comprises a head-mounted device (HMD), a computer coupled to the HMD, and the means for tracking the pose of the user's head. In one case, the HMD comprises the at least one light source and the computer comprises the at least one processor. Therefore, compositing tasks pertaining to presentation of the XR environment are entirely performed at the computer, by the at least one processor. In another case, the HMD comprises the at least one light source, and the at least one processor is implemented at both the HMD and the computer. Therefore, compositing tasks pertaining to presentation of the XR environment are performed in a shared manner at both the HMD and the computer, by the at least one processor. The computer may be coupled to the HMD wirelessly and/or in a wired manner. Examples of the computer include, but are not limited to, a desktop computer, a laptop computer, a tablet computer, a workstation, and an XR console.

In another implementation, the display apparatus comprises an HMD and the means for tracking the pose of the user's head. In such a case, the HMD comprises the at least one light source and the at least one processor. Therefore, compositing tasks pertaining to presentation of the XR environment are entirely performed at the HMD, by the at least one processor.

It will be appreciated that the HMD is worn by the user on his/her head. The HMD is implemented, for example, as an XR headset, a pair of XR glasses, and the like, that is operable to display a visual scene of the XR environment to the user.

Throughout the present disclosure, the term "means for tracking the pose of the user's head" refers to a specialized equipment for detecting and optionally, following changes in the pose of the user's head, when the HMD is worn by the user. In practice, the aforesaid means is typically employed to track a pose of the HMD, and the pose of the user's head corresponds to the pose of the HMD. Throughout the present disclosure, the term "pose" encompasses both position and orientation. The pose of the user's head is determined in a three-dimensional coordinate space, which could be a global coordinate space of the extended-reality environment. Furthermore, tracking of the pose of the user's head is typically performed at a high frequency (for example, such as 1000 Hertz). The means for tracking the pose of the user's head could be implemented as at least one of: an optics-based tracking system (which utilizes, for example, infrared beacons and detectors, infrared cameras, visible-light cameras, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). Such head-tracking means are well-known in the art.

Moreover, said means employs either an outside-in tracking technique or an inside-out tracking technique for collecting the pose-tracking data pertaining to the pose of the user's head. As an example, said means may be implemented as Valve Corporation's SteamVR® tracking (that employs the outside-in tracking technique), where active lighthouses (that are detectable objects) sending infrared signals are installed at fixed locations in a real-world environment in which the HMD is being used. In such a case, the HMD comprises detectors that detect these infrared signals and determine the pose (namely, the position and orientation) of the HMD relative to the fixed locations of the lighthouses. As another example, said means may be implemented as a magnetic tracking system from Polhemus, where an active magnetic field is generated using a transmitter in a real-world environment, and at least one receiver that is capable of sensing the magnetic field is installed into the HMD.

Throughout the present disclosure, the term "light source" refers to an element from which light emanates. Optionally, a given light source is implemented as a display. In this regard, a given image is displayed at the given light source. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Optionally, a given light source is implemented as a projector. In this regard, a given image is projected onto a projection screen or directly onto a retina of the user's eyes. Examples of the projector include, but are not limited to, an LCD-based projector, an LED-based projector, an OLED-based projector, an LCoS-based projector, a Digital Light Processing (DLP)-based projector, and a laser projector.

It will be appreciated that a given light source could be a multi-resolution light source, or a single-resolution light source. Multi-resolution light sources are configured to display images at two or more resolutions, whereas single-resolution light sources are configured to display images at a single resolution only. Optionally, the display apparatus comprises one light source per eye, wherein each light source is a multi-resolution light source. Alternatively, optionally, the display apparatus comprises at least two light sources per eye, the at least two light sources comprising at least one first light source and at least one second light source, wherein the at least one first light source is configured to display images at a first resolution and the at least one second light source is configured to display images at a second resolution, the second resolution being higher than the first resolution.

The at least one processor is coupled to the means for tracking the pose of the user's head and the at least one light source. The at least one processor is also coupled to the rendering server. The at least one processor could be a processor of the HMD and/or a processor of the computer coupled to the HMD. The at least one processor may be understood to be a compositor (namely, a processing unit that is configured to perform at least the compositing tasks).

Typically, when the user uses the HMD, the pose of his/her head may change as the user may move his/her head for various reasons such as his/her comfort, tracking a motion of a moving object in the XR environment, a sound made by a given object in the XR environment, and the like. Notably, pose-tracking data of a current time instant is indicative of the position and the orientation of the user's head at the current time instant, whereas pose-tracking data of the current time instant as well as at least one previous time instant is indicative of the velocity and the acceleration of the user's head. The position and the orientation of the user's head at the current time instant are used to determine a current viewpoint and a current view direction, respectively, from which the user is currently viewing a region (namely, a scene) of the XR environment. The velocity and the acceleration of the user's head are used to determine how fast the user's current viewpoint and current view direction are changing (at the current time instant) and to predict a viewpoint and a view direction in future.

The predicted viewpoint and the view direction of the user in the XR environment at a future time instant are accurately predicted by the at least one processor, as the velocity and the acceleration of the user's head at the current time instant are used for predicting a change that will occur in the position and the orientation of the user's head between the current time instant and the future time instant. A predicted position and a predicted orientation of the user's head are indicative of the predicted viewpoint and the predicted view direction of the user in the XR environment from which the user is going to view a region of the XR environment at the future time instant. The predicted position and the predicted orientation of the user's head lie along a direction of the velocity and the acceleration of the user's head.

It will be appreciated that typically, change in viewpoint is much slower than a frame rate at which a sequence of images is to be displayed. For example, when the XR environment represents a person moving at a speed of 6 kilometer per hour, there may be a 1.6 cm change in locations of the person between successive images. Change in view direction may be much faster than the change in viewpoint. However, the change in view direction does not imply that there occurs change in the viewpoint.

The predicted viewpoint and the predicted view direction of the user are indicative of a location and a perspective from which the user would view the XR environment, respectively. Therefore, the predicted viewpoint and the predicted view direction of the user are effectively employed by the at least one processor to accurately determine the region of the XR environment which would be visible to the user at the future time instant. This region of the XR environment is to be presented to the user at the future time instant. The region to be presented represents a scene of the XR environment that is to be shown in a single image. As an example, when the predicted viewpoint and the and the predicted view direction correspond to an object that would lie to the right of another object that is being shown in a currently-presented region, the region to be presented is determined to be one that lies to the right of the currently-presented region.

It will be appreciated that the region to be presented can be divided into a plurality of sub-regions. Typically, any region to be presented is rendered by rendering its sub-regions. Moreover, a given sub-region could be represented by a pixel, a pixel segment having a predefined shape (for example, such as rectangles or triangles), or a pixel segment having an arbitrary shape (for example, such as a freeform shape). The given sub-region could be hardware-dependent (namely, dependent on hardware specifications of the at least one light source). As an example, when the at least one light source displays images in form of rectangular slices, the given sub-region may be represented as a pixel segment having a rectangular shape. Such a rectangular slice could be addressed using coordinates of one corner of the rectangular slice along with a width and a height of the rectangular slice. Optionally, the at least one processor is configured to divide the region to be presented into the plurality of sub-regions. Such division may be based on one or more of: the hardware specifications of the at least one light source, visual content of the region, a predefined setting for division of the region into sub-regions, and the like.

Optionally, rendering information of a given sub-region comprises at least one of: colour information, depth information, intensity information, optical flow information, material information, object information, surface normal information, lighting information, transparency information. The given sub-region is understood to be rendered when its rendering information is generated. The rendering information is used for displaying the given sub-region in an image.

The "colour information" of the given sub-region comprises information regarding colours in the given sub-region. As an example, the colour information may include colour values for pixels corresponding to the given sub-region. These colour values may, for example, be expressed as Red-Green-Blue (RGB) colour values or YUV colour values.

The "depth information" of the given sub-region comprises information regarding depths in the given sub-region. These depths may be optical distances between points represented in the given sub-region and the user. As an example, the depth information may include depth values for pixels corresponding to the given sub-region.

The "intensity information" of the given sub-region comprises information regarding intensities of colours in the given sub-region. As an example, the intensity information may include intensity values (indicative of brightness or darkness) for the colours of the pixels corresponding to the given sub-region.

The "optical flow information" of the given sub-region comprises information regarding optical flow or motion of moving objects represented in the given sub-region. The motion of the moving objects is apparent to the user over several consecutive displayed images. As an example, the optical flow information may include at least one optical flow vector indicating a direction of motion of at least one moving object. The at least one optical flow vector may be a spline, a straight two-dimensional (2D) vector, a three-dimensional (3D) vector, and the like.

The "material information" of the given sub-region comprises information regarding properties of materials in the given sub-region. These properties of the materials encompass types of the materials, textures of the materials, specularity of the materials, reflectivity of the materials, refractivity of the materials, diffusion factors of the materials, and the like. As an example, the material information may include a bump map that simulates bumps and wrinkles on surfaces of the materials, thereby indicating the textures of the materials. As another example, the material information may include a texture map indicating the textures of the materials.

The "object information" of the given sub-region comprises information regarding characteristics of objects in the given sub-region. These characteristics of objects encompass identifications of the objects, types of the objects, shapes of the objects, sizes of the objects, positions of the objects, and the like. As an example, shapes of the objects may be expressed in formats such as triangles, voxels, point clouds, distance maps, and the like.

The "surface normal information" of the given sub-region comprises information regarding a geometry of surfaces in the given sub-region. As an example, the surface normal information may include surface normal vectors for distinct points on the surfaces in the given sub-region.

The "lighting information" of the given sub-region comprises information regarding lighting characteristics in the given sub-region. These lighting characteristics encompass types of lighting (indoor or outdoor), types of light sources (such as bulbs, LEDs, sun, and the like), locations of light sources, paths of light, strength of light, properties of light (such as reflection, refraction, dispersion, and the like), types of shadows, locations and/or shapes of shadows, movement of shadows, and the like. As an example, the lighting information may include a shadow map for the given sub-region, shadow factors for the given sub-region, and shadow velocities in the given sub-region. As another example, the lighting information may include a lightmap indicative of in-baked lighting in the given sub-region.

The "transparency information" of the given sub-region comprises information regarding transparency of the objects in the given sub-region. The transparency information is also indicative of opacity information of the given sub-region, as opacity is indicated by a low level of transparency. As an example, the transparency information may include transparency values or opacity values for pixels corresponding to the given sub-region.

Optionally, the at least one sub-region whose rendering information is to be derived from the previous rendering information is determined based on visual content of the at least one sub-region. When visual content of a given sub-region represents at least one of: a dis-occluded portion of the XR environment, a portion of the XR environment that lay outside a viewport while the at least one previously-presented region was being displayed, a moving object in the XR environment, a state-changing object in the XR environment, the given sub-region is not determined to be one whose rendering information is to be derived from the previous rendering information. Such types of visual content are dynamic in nature and may change rapidly across image frames. Rendering information of the dis-occluded portion would not be available in the previous rendering information, as the dis-occluded portion would not be shown (as it is occluded) in the at least one previously-presented region of the XR environment. Similarly, rendering information of the portion that lay outside the viewport (namely, an area of the HMD that is employed for displaying) may also be unavailable in the previous rendering information, as said portion is not shown in the at least one previously-presented region. Moreover, the previous rendering information of the moving object would be outdated and unusable for generating the rendering information of the moving object in the region to be presented, as the moving object would have moved from its place in the at least one previously-presented region by the time the region is to be presented to the user. Likewise, the previous rendering information of the state-changing object would be outdated and unusable for generating the rendering information of the state-changing object in the region to be presented, as the state-changing object may have changed its state (for example, its shape, colour, size, and the like) represented in the at least one previously-presented region by the time the region is to be presented to the user.

It will be appreciated that sub-regions that do not include dis-occluded portions of the XR environment, portions of the XR environment lying outside the viewport, moving objects, and/or state-changing objects in the XR environment can be considered to have considerably similar visual content as their corresponding sub-regions of at least one previously-presented region of the XR environment. Therefore, such sub-regions are determined as the at least one sub-region whose rendering information is to be derived from the previous rendering information of at least one corresponding sub-region of at least one previously-presented region of the XR environment.

The at least one processor is configured to analyse visual content of each of the plurality of sub-regions of the region, to determine the at least one sub-region whose rendering information is to be derived from the previous rendering information. Such analysis may include comparing the visual content of each of the plurality of sub-regions of the region with their corresponding historical visual content of at least one corresponding sub-region of at least one previously-presented region to identify whether or not the given sub-region of the region represents at least one of: the dis-occluded portion, the portion of lying outside the viewport, the moving object, the state-changing object.

The rendering information of the at least one sub-region is generated, by the at least one processor, by effectively repurposing the previous rendering information. Since the at least one sub-region is considered to have consistent visual content in the at least one previously-presented region and the region to be presented, the previous rendering information can be reused for generating the rendering information of the at least one sub-region. This provides a technical benefit of reducing the processing burden on the rendering server as the rendering server is not required to generate the rendering information of the at least one sub-region. A workload of processing tasks pertaining to generation of rendering information of the plurality of sub-regions is efficiently shared by the at least one processor and the rendering server.

Optionally, the rendering information of the at least one sub-region is same as the previous rendering information. Alternatively, optionally, the rendering information of the at least one sub-region is derived from the previous rendering information. In such a case, the at least one processor may perform one or more processing operations (such as modification of of data values) on the previous rendering information for generating the rendering information of the at least one sub-region.

The term "rendering server" refers to a computer that is configured to execute a rendering application. The rendering application, when executed, performs rendering operations for XR applications. In one implementation, the display apparatus and the rendering server are communicably coupled via a data communication network. The data communication network may be wired, wireless or any combination thereof. In another implementation, the at least one processor (of the display apparatus) and the rendering server could be implemented on a same computer.

It will be appreciated that all information relating to VR applications resides with the rendering application, typically, in the form of a set of rules, objects, rendering buffers, and the like. In case of MR applications, for example, there is an additional real-world component which is superimposed on a virtual-world component. In such a case, the rendering operations for the MR applications are performed in a manner that the virtual-world component and the real-world component realistically interact with each other. Therefore, information pertaining to real-world objects in a real-world environment at which the user (of the HMD) is present is required by the rendering server for performing the rendering operations for the MR applications. In an example, virtual objects are required to realistically reflect light emanating from real-world objects. In another example, when virtual objects include virtual light sources, a brightness of real-world objects is required to be adjusted accordingly.

Optionally, the display apparatus comprises at least one sensor, wherein the rendering server is configured to process sensor data of the at least one sensor to obtain the information pertaining to the real-world objects in the real-world environment. Optionally, the sensor data is sent from the at least one sensor to the rendering server, via the at least one processor. The at least one sensor is arranged in the real-world environment and/or on the HMD. Optionally, the at least one sensor is implemented as at least one of: a camera (such a visible light camera, a depth camera, and the like), a light intensity sensor, a depth sensor. It will be appreciated that in some cases, the at least one processor may process the sensor data to obtain the information pertaining to the real-world objects, and send the information to the rendering server.

Optionally, the rendering server uses at least one rendering buffer to store the rendering information generated by the rendering server. Optionally, the at least one processor uses at least one display buffer to store the rendering information which is to be used by the at least one light source for displaying the at least one image. In some implementations, the at least one rendering buffer and the at least one display buffer are separate from each other but are communicably coupled to each other, whereas in other implementations, the at least one rendering buffer and the at least one display buffer are implemented as at least one shared buffer. Optionally, the rendering server comprises a rendering engine (for example, such as a raytracing engine, a rasterization engine, a hybrid engine, and similar) for storing the rendering information in the at least one rendering buffer.

Optionally, the at least one rendering buffer and/or the at least one display buffer is implemented as at least one of: a colour buffer, a depth buffer, an intensity buffer, an optical flow buffer, a material buffer, an object buffer, a surface normal buffer, a lighting buffer, a transparency buffer. Notably, a given buffer may be a one-dimensional (1D) data structure, a 2D data structure, a 3D data structure, or similar. Moreover, two or more of the aforesaid buffers may be implemented in an integrated form. The colour buffer is used to store the colour information, the depth buffer is used to store the depth information, the intensity buffer is used to store the intensity information, the optical flow buffer is used to store the optical flow information, the material buffer is used to store the material information, the object buffer is used to store the object information, the surface normal buffer is used to store the surface normal information, the lighting buffer is used to store the lighting information, and the transparency buffer is used to store the transparency information. It will be appreciated that the at least one rendering buffer and/or the at least one display buffer is implemented as at least the colour buffer. The colour buffer is essentially required for presenting the XR environment to the user.

In one example, the colour buffer and the transparency buffer may be implemented together as a Red-Green-Blue-Alpha (RGB-A) buffer wherein RGB values are indicative of colours and alpha values are indicative of transparencies. For example, the alpha values may lie in a range of 0 to 1 wherein 0 indicates full transparency and 1 indicates full opacity. In another example, the transparency buffer may be implemented as a multi-layer buffer that separately stores the transparency information for different depths represented in the region to be presented.

The information indicative of remaining sub-regions of the region to be presented and the pose information are sent to the rendering server, to facilitate the rendering server in generating the rendering information of the remaining sub-regions of the region to be presented in a pose-consistent manner using the predicted viewpoint and the predicted view direction of the user. The rendering server, in operation, only generates the rendering information of the remaining sub-regions of the region to be presented using the pose information, instead of generating rendering information for all sub-regions of the region. This beneficially eases the processing burden on the rendering server. Rendering information of a given remaining sub-region is generated upon re-rendering the remaining sub-region. It will be appreciated that the pose information could also be indicative of the position, the orientation, the velocity and the acceleration of the user's head. This enables the rendering server to accurately update the predicted viewpoint and the predicted view direction at a time of re-rendering, if required.

Optionally, a time duration required for generating the rendering information of the remaining sub-regions is determined based on the frame rate at which the sequence of images is to be displayed and/or a pre-set number of remaining sub-regions that can be re-rendered. This time duration is generally of the order of a few milliseconds.

It will be appreciated that the rendering information of the remaining sub-regions is sent from the at least one rendering buffer to the at least one display buffer. Alternatively, when the at least one rendering buffer and the at least one display buffer are implemented as the at least one shared buffer, the rendering information of the remaining sub-regions is stored in the at least one shared buffer.

The at least one processor generates the at least one image to be displayed, by merging the rendering information of the at least one sub-region and the rendering information of the remaining sub-regions to obtain rendering information of an entirety of the region to be presented. The at least one processor adds the rendering information of the at least one sub-region to the at least one display buffer or the at least one shared buffer. Then, the rendering information of an entirety of the region to be presented is stored in the at least one display buffer.

The at least one processor controls the at least one light source to display the at least one image. Optionally, the frame rate at which the sequence of images is displayed (by the at least one light source) lies in a range of 60 Hertz to 100 Hertz. More optionally, the frame rate at which the sequence of images is displayed lies in a range of 90 Hertz to 100 Hertz. As an example, the frame rate may be 90 Hertz. Such a frame rate provides required visual fidelity for an immersive viewing experience of the user.

It will be appreciated that a manner in which the at least one display buffer is updated for displaying a given image may be dependent on hardware specifications of the at least one light source. As an example, the at least one display buffer may be updated on a pixel-by-pixel basis, a slice-by-slice basis, or all at once, based on the hardware specifications of the at least one light source. It will be also be appreciated that the at least one display buffer is updated as per a displaying requirement. As an example, when an entirety of the at least one image is not required to be displayed at once, the at least one display buffer may be updated on the pixel-by-pixel basis or the slice-by-slice basis Optionally, the at least one processor is configured to post-process the at least one image prior to displaying via the at least one light source. Examples of post-processing operations include, but are not limited to:

lens-distortion and colour-distortion correction,
reprojection based on the pose of the user's head.

In this regard, the post-processing of the at least one image prior to displaying is a compositing task that is performed to enhance a perceived quality and realism of the at least one image upon displaying, to provide a rich and immersive viewing experience to the user. The at least one image can be post-processed by applying at least one post processing operation. Additional examples of post-processing operations include vignetting, colour grading, anti-aliasing, and the like.

In an example, the lens-distortion and colour-distortion correction operations may be performed to adjust visual content of the at least one image to fit into a setup of the at least one light source and optical elements(s) in the HMD. The lens-distortion and colour-distortion correction operations may be performed by:

determining at least one transformation to be applied to the at least one image for correcting apparent distortions that would be produced when the at least one image is displayed, and applying the at least one transformation to the at least one image prior to displaying. The at least one transformation is optionally determined based on at least one of: the pose information, an arrangement of optical elements in the HMD, sizes of the optical elements in the HMD. Examples of the at least one transformation include, but are not limited to, spatially shifting one or more pixels of the at least one image, colour-correcting one or more pixels of the at least one image, and the like.

In another example, the reprojection (namely, warping) of the at least one image may be performed based on a latest pose of the user's head, to match visual content represented in the at least one image with the latest pose of the user's head. Such reprojection may also lead to a requirement for re-rendering certain sub-regions of regions represented in the at least one image. For example, upon reprojection, certain occluded objects represented in the sub-regions may become visible. Rendering information for such sub-regions may be derived from previous rendering information by the at least one processor, or may be generated by the rendering server, or may be generated by the at least one processor. Moreover, reprojection also increases an apparent frame rate of displaying the at least one image. For example, when the rendering server generates the rendering information at a rate of 50 Hertz, warping may be employed for reprojecting every image prior to displaying by utilizing the latest pose of the user's head, to provide an apparent frame rate of 100 Hertz. Optionally, the reprojection of the at least one image is performed using at least one projection matrix. The at least one projection matrix is applied to the at least one image prior to displaying the at least one image. Here, the term "projection matrix" refers to a matrix that is indicative of a geometrical relationship between three-dimensional points of an XR region (namely, an XR scene) and two-dimensional pixels of the at least one light source. Optionally, the at least one projection matrix is determined based on at least one of: near and far clipping planes for the at least one light source, an angular extent of a field of view providable by the at least one light source, at least one transformation (for example, affine transform). When the at least one image is reprojected, the at least one image is accurately representative of how the region to be present would appear to the user, given the latest pose of the user's head.

Optionally, an angular size of a field of view represented by a given image is larger than an angular size of a field of view providable by a given light source. Optionally, in this regard, the angular size of the field of view represented by the given image lies in a range of 100 percent to 400 percent of the angular size of the field of view providable by the given light source. This allows for effectively coping with movement of the HMD (for example, when the user re-adjusts the HMD on his/her head).

Optionally, the at least one processor is configured to:
obtain indicative of a blink or saccade of the user's eyes; and
stop displaying or display at a low resolution, a given image that is to be displayed during the blink or saccade of the user's eyes.

In this regard, the stoppage of displaying or displaying at the low resolution is only temporary, and lasts only for the duration of the blink or saccade, to relieve a computational burden of displaying for that duration, on the at least one processor. As a result, in said duration, the at least one processor can perform other processing tasks. Optionally, the information indicative of the blink or saccade of the user's eyes comprises at least one of: a time at which the blink or saccade occurs, a predicted time at which the blink or saccade is expected to occur, a frequency of occurrence of blinks, a frequency of occurrence of saccades. Optionally, the information indicative of the blink or saccade of the user's eyes is derived from one of: means for tracking a user's gaze, at least one camera pointing at the user's eyes, eye-blink sensor data measured by an eye-blink sensor, sensors of the display apparatus.

It will be appreciated that there exist well-defined protocols for communication between the at least one processor and the rendering server. These protocols can be implemented using queues, shared memory (namely, shared rendering and display buffers which may be called draw_list), and the like. Moreover, these protocols can be implemented synchronously or asynchronously. One such exemplary definition of protocols is described here. When initializing the display apparatus, the rendering server may issue a session initialization request (Init_sesssion( )) to the at least one processor. In call parameters of this request, the rendering server informs the at least one processor of the at least one rendering buffer that is shared with or communicably coupled to the at least one processor. Then, the at least one processor returns back parameters comprising at least one of: hardware specifications of the HMD (for example, such as hardware specifications of the at least one light source, a number of the at least one light source, the frame rate for displaying, the resolution of displaying, and the like), an occlusion mesh defining the viewport, and the position, the orientation, the velocity and the acceleration of the user's head. The occlusion mesh is a mask defining a form (for example, a curved polygon with its corners cut and inner corners adjusted for nose effect) in which at least one image is to be displayed. The occlusion mesh may be static of dynamic. As an example, the occlusion mesh may be dynamically re-defined when the user re-adjusts the HMD on his/her head. Optionally, the hardware specifications of the HMD is sent only once per viewing session. Thereafter, the at least one processor signals, to the rendering server, its readiness to start presenting the XR environment. Then, the rendering server executes a rendering loop such as:

```
While(not terminated) do {
-   wait(Sync);
-   draw_buffer( );
-   submit( );
}
``` wherein Sync is a signal from the at least one processor indicating a good moment to start rendering, draw_buffer( ) is a function for rendering, and submit( ) is a signal which indicates that the rendering information is ready for sending to the at least one processor. The Sync signal is optional as the rendering may be static or a maximum flow of frames (such as when the at least one rendering buffer is ready and submitted to the at least one processor, the rendering server reads a new pose information and starts draw_buffer( ).

Optionally, when re-rendering is required in situation where processing resources of the rendering server are limited (for example, when re-rendering takes more time than estimated), the rendering server (or optionally, the at least one processor) is configured to generate rendering information of certain sub-regions based on their corresponding previous rendering information to meet frame rate requirements. Additionally, optionally, rendering information for a given sub-region is generated using rendering information for its neighbouring sub-region. In such a situation, the at least one processor notes that all rendering requests have not been fulfilled, and therefore, limits a number of rendering requests to be sent to the rendering server, cancels old requests sent to the rendering server, and the like.

Optionally, the display apparatus further comprises means for tracking a user's gaze, wherein the at least one processor is configured to:
  process gaze-tracking data, collected by the means for tracking the user's gaze, to determine a gaze direction, a gaze velocity and a gaze acceleration per eye of the user;
  predict a gaze location of the user in the extended-reality environment, based on the gaze direction, the gaze velocity and the gaze acceleration; and
  send, to the rendering server, gaze information indicative of the predicted gaze location,
wherein the region to be presented is determined based on the predicted gaze location.

Optionally, in this regard, the HMD comprises the means for tracking the user's gaze. Throughout the present disclosure, the term "means for tracking the user's gaze" refers to a specialized equipment for detecting and/or following gaze of the user, when the HMD in operation is worn by the user. The means for tracking the user's gaze could be implemented as contact lenses with sensors, cameras monitoring a position of a pupil of the user's eye, and the like. Such means for tracking the user's gaze are well-known in the art. It will be appreciated that the gaze-tracking data is collected repeatedly by the means for tracking the user's gaze, as gaze of the user's eyes keeps changing whilst he/she uses the HMD. An up-to-date information indicative of the gaze of the user's eyes allows for producing an up-to-date gaze-contingent XR environment for presenting at the HMD.

Throughout the present disclosure, the term "gaze direction" refers to a gaze vector, wherein the gaze vector is generated by processing the gaze-tracking data. Moreover, the gaze direction is used to determine the gaze location, which is a location in the XR environment at which the user is looking. Moreover, the gaze velocity and the gaze acceleration are used to determine how fast the gaze direction at the current time instant is changing and to predict a gaze location in future. The predicted gaze location is a location in the XR environment at which the user is going to look at the future time instant.

Optionally, the gaze information is also indicative of the gaze direction, the gaze velocity and the gaze acceleration per eye of the user. This enables the rendering server to update the predicted gaze location accurately, if required. The rendering server maps the predicted gaze location onto the XR environment to determine a region of the environment that corresponds to the predicted gaze location, and said region is determined to be the region to be presented. This region may also be known as "region of interest" or a "focus region" within the environment, as the predicted gaze location of the user corresponds to this region. When the region to be presented is determined based on the predicted gaze location, all sub-regions of said region correspond to the predicted gaze location. Regions of the XR environment that correspond to the user's gaze are perceived with high visual acuity by foveas of the user's eyes, and in such a case, the display apparatus can emulate active foveation of the human visual system. As an example, when the region to be presented is determined based on the predicted gaze location, an image representing said region may be displayed at the second resolution via the at least one second light source. Moreover, an image representing another region that surrounds the region which is determined based on the predicted gaze location may be displayed at the first resolution via the at least one first light source.

Optionally, the at least one sub-region of the region to be presented whose rendering information is to be derived from the previous rendering information is determined based on the predicted gaze location. Optionally, in this regard, the at least one sub-region whose rendering information is to be derived from the previous rendering information is determined to be that which does not correspond to the predicted gaze location of the user. Sub-region(s) that correspond to the predicted gaze location are required to be up-to-date and to have high quality as the user is predicted to focus on them. Therefore, the rendering information for the sub-region(s) that correspond to the predicted gaze location is required to be re-generated by the rendering server at the required high quality. However, the rendering information for the at least one sub-region which does not correspond to the predicted gaze location can be effectively derived the previous rendering information, as the user is not predicted to focus thereat. When the rendering information for the at least one sub-region which does not correspond to the predicted gaze location is derived from the previous rendering information, the rendering information has an acceptable quality. It will be appreciated that a quality of the sub-region(s) that correspond to the predicted gaze location is required to be much greater (for example, five times greater, ten times greater, and the like) than the quality of the at least one sub-region that does not correspond to the predicted gaze location.

Optionally, the at least one processor is configured to compute a quality score for each sub-region of the region to be presented, wherein a quality score is computed for a given sub-region based on whether or not previous rendering information of at least one corresponding sub-region of the at least one previously-presented region is available for the given sub-region. Herein, the "quality score" of the given sub-region is a measure of sufficiency of the previous rendering information corresponding to the given sub-region for re-displaying the given sub-region in a new image. Optionally, the quality score of the given sub-region lies in a range of 0 to 1. Here, 0 indicates lowest quality (or worst quality), while 1 indicates highest quality (or perfect quality). For example, the quality score of the given sub-region may be from 0, 0.1, 0.2, 0.3, 0.4, 0.5, 0.6, 0.7, 0.8 or 0.9 up to 0.1, 0.2, 0.3, 0.4, 0.5, 0.6, 0.7, 0.8, 0.9 or 1. Alternatively, optionally, the quality score of the given sub-region lies in a range of 0 to 100. Here, 0 indicates lowest quality, while 100 indicates highest quality. For example, the quality score of the given sub-region may be from 0, 10, 20, 30, 40, 50, 60, 70, 80, or 90 up to 10, 20, 30, 40, 50, 60, 70, 80, 90 or 100. It will be appreciated that the quality score of the given sub-region may also be expressed as a percentage, given any range of the quality score. As an example, the quality score of the given sub-region may be 0.7, or 70 percent quality.

It will be appreciated that the quality score is a dynamic feature, whose value is computed dynamically based on at least one criterion. Lower the quality score of the given sub-region, greater is the requirement for re-rendering the given sub-region. A technical benefit of computing the quality score is that it enables in logically assessing and quantifying the requirement for re-rendering, so that only those sub-regions whose previous rendering information is insufficient for deriving the rendering information are re-rendered, and the rendering server is not unnecessarily overburdened. In a case when the previous rendering information of at least one corresponding sub-region of the at least one previously-presented region is available for the given sub-region, the previous rendering information can be used by the at least one processor to generate the rendering information of the given sub-region. Therefore, the quality score of the given sub-region is non-zero. Alternatively, in a case when the previous rendering information of at least one corresponding sub-region of the at least one previously-presented region is unavailable for the given sub-region, the previous rendering information cannot be used by the at least one processor to generate the rendering information of the given sub-region. Therefore, the rendering information of the given sub-region is required to be generated by the rendering server, and the quality score of the given sub-region is zero. As an example, the quality score of the given sub-region may be zero when the at least one corresponding sub-region is occluded in the at least one previously-presented region, or when the at least one corresponding sub-region lies outside the viewport.

Optionally, the quality score is computed for the given sub-region based on whether or not a portion of the given sub-region is to be visualized at a dead-angle. When the predicted view direction is such that the user would view the portion of the given sub-region from the dead-angle (namely, an angle from which the user has not viewed earlier), the quality score for the given sub-region is zero as rendering information for the portion of the given sub-region would be unavailable in the previous rendering information.

Optionally, the quality score is computed for the given sub-region based on a comparison of a resolution required for the given sub-region and a resolution at which the previous rendering information of the at least one corresponding sub-region is available. Optionally, when the resolution required for the given sub-region is equal to or lesser than the resolution at which the previous rendering information of the at least one corresponding sub-region is available, the quality score for the given sub-region is high (for example, is greater than 0.5 when the quality score lies in a range of 0 to 1). In such a case, the rendering information for the given sub-region may be derived from the previous rendering information of the at least one corresponding sub-region by either using the resolution in the previous rendering information or by reducing the resolution (namely, subsampling) in the previous rendering information. Alternatively, optionally, when the resolution required for the given sub-region is greater than the resolution at which the previous rendering information of the at least one corresponding sub-region is available, the quality score for the given sub-region is low (for example, is equal to or less than 0.5 when the quality score lies in a range of 0 to 1). In such a case, the rendering information for the given sub-region is required to be re-rendered by the rendering server.

Optionally, the quality score for the given sub-region is inversely related to a square of a distance between the user and an object represented in the given sub-region. For example, when said distance is Z units at a time of displaying the at least one previously-presented region, and said distance would be Z/2 units at a time of displaying the region to be presented, the quality score for the given sub-region reduces to ¼th of an original quality score of the at least one corresponding sub-region. This is so because the resolution at which the previous rendering information of the at least one corresponding sub-region is available is much lesser than the resolution required for the given sub-region. When said distance halves, rendering the given sub-region requires 4 times higher resolution than what is available in the previous rendering information of the at least one corresponding sub-region of the at least one previously-presented region.

Optionally, the quality score is computed for the given sub-region based on whether or not the given sub-region corresponds to the predicted gaze location. When the given sub-region corresponds to the predicted gaze location, the resolution required for the given sub-region is high, and the quality score computed for the given sub-region is low. In such a case, the rendering information for the given sub-region is required to be re-rendered by the rendering server, to facilitate in displaying the given sub-region at the required resolution (which is high). Alternatively, when the given sub-region does not correspond to the predicted gaze location, the quality score computed for the given sub-region is low, and the rendering information for the given sub-region may be derived from the previous rendering information of the at least one corresponding sub-region. As an example, a resolution required for a sub-region that corresponds to the predicted gaze location is ten times greater than a resolution required for a sub-region that does not correspond to the predicted gaze location.

Optionally, when multiple sub-regions correspond to the predicted gaze location, different sub-regions have different quality scores based on when the gaze location is directed towards them. For example, a first sub-region towards which the gaze location will be directed sooner than a second sub-region will be assigned a lower quality score as compared to the second sub-region, in order to enable prioritization of re-rendering of the first sub-region over the re-rendering of the second sub-region.

Optionally, the quality score is computed for the given sub-region based on a comparison of colours required for the given sub-region and colours in the previous rendering information of the at least one corresponding sub-region of the at least one previously-presented region. When a difference between these colours is greater than a certain value, the quality score for the given sub-region is low, and vice versa.

Optionally, the quality score is computed for the given sub-region based on a comparison of a surface normal required for the given sub-region and a surface normal at which the previous rendering information of the at least one corresponding sub-region of the at least one previously-presented region is available for the given sub-region. When a difference between these surface normals is greater than a certain value, the quality score for the given sub-region is low, and vice versa.

Optionally, the quality score is computed for the given sub-region based on whether or not the given sub-region represents an animated object. When the given sub-region represents the animated object, the quality score for the given sub-region is low, thereby indicating a high need for re-rendering the given sub-region, and vice versa. A high frequency of rendering animated objects makes the animated object, when displayed in the sequence of images, appear realistic to the user. However, to the animated objects can optionally be rendered at a low frequency, in order to reduce the processing burden on the rendering server.

Optionally, the quality score is computed for the given sub-region based on a comparison of lighting characteristics required for the given sub-region and lighting characteristics that are available in the previous rendering information of the at least one corresponding sub-region. In an example, when the given sub-region receives moving light, the quality score for the given sub-region is low, as due to movement of the light the lighting characteristics required for the given sub-region are likely to be different from the lighting characteristics available in the previous rendering information. In another example, when the given sub-region represents a moving object, the quality score for the given sub-region is low, as due to movement of said object, corresponding shadows cast by said object in the given sub-region would also need to be updated. As another example, when the given sub-region represents soft shadows, the quality score for the given sub-region is low as soft shadows require high resolution.

Optionally, the quality score is computed for the given sub-region based on whether or not the given sub-region represents a boundary of an object. When the given sub-region represents the boundary of the object, the quality score for the given sub-region is low, thereby indicating a high need for re-rendering the given sub-region. This is so because object boundaries need to appear up-to-date and distortion-free to the user for a satisfactory viewing experience.

It will be appreciated that the quality score is computed for the given sub-region in a dynamic manner, based on at least one of the aforesaid conditions. Optionally, the at least one processor is configured to assign a weight to each condition used as a basis for computing the quality score. The quality score is computed as a weighted sum of quality scores of different conditions, wherein the different conditions affect the quality score to different extents (that are specified by different weights). As an example, a first weight assigned to the criteria of whether or not the previous rendering information of the at least one corresponding sub-region is available for the given sub-region is higher than a second weight assigned to the criteria of whether or not the given sub-region represents an animated object.

Optionally, the at least one processor is configured to:
  determine a priority order in which the remaining sub-regions of the region to be presented are required to be re-rendered, based on corresponding quality scores of the remaining sub-regions; and
  send the priority order to the rendering server, wherein the rendering information of the remaining sub-regions is received from the rendering server as per the priority order.

Herein, the priority order is a decreasing order of priority of re-rendering the remaining sub-regions of the region to be presented. Optionally, the priority order is defined to be inverse of an increasing order of quality scores of the remaining sub-regions. In particular, a highest priority is assigned to a remaining sub-region having a lowest quality score, a lowest priority is assigned to a remaining sub-region having a highest quality score, and so on. Simply put, lower the quality score for a sub-region, higher is the sub-region in the priority order, as a lower quality score is indicative of a greater need for re-rendering. As an example, when quality scores of five sub-regions X1, X2, X3, X4, and X5 are Q1, Q2, Q3, Q4, and Q5, respectively, wherein Q5>Q4>Q3>Q2>Q1, the priority order is: X1, X2, X3, X4, X5.

Optionally, when the priority order is received by the rendering server, the rendering server executes re-rendering of the remaining sub-regions as per the priority order. Referring to the above example, the rendering server re-renders the remaining sub-regions in the order: X1, X2, X3, X4, X5. Optionally, the rendering information of a given remaining sub-region is sent, from the rendering server to the at least one processor, immediately upon re-rendering the given remaining sub-region. Therefore, for the above example, rendering information of the remaining sub-regions is received in the order: X1 X2, X3, X4, X5.

Optionally re-rendering the remaining sub-regions as per the priority order beneficially enables efficient utilization of resources of the rendering server. As an example, the resources (such as a graphics processing unit (GPU), a central processing unit (CPU), a memory, and the like) of the rendering server can be optimally divided to perform both rendering operations and re-rendering operations.

It will be appreciated that the priority order is hierarchical in nature, wherein a remaining sub-region having the lowest quality score is at the top of the hierarchy and a remaining sub-region having the highest quality score is at the bottom of the hierarchy. Optionally, the priority order includes a limited number of the remaining sub-regions to be re-rendered, wherein said limit is defined by the pre-set number of remaining sub-regions that can be re-rendered and/or the time duration required for generating the rendering information. The pre-set number and/or the time duration may be determined according to available dynamic processing resources of the rendering server. As an example, 20 sub-regions of the region to be presented are required to be re-rendered. In one case, the pre-set number of sub-regions that can be re-rendered may be equal to 15. In such a case, the priority order would include only 15 sub-regions having the lowest quality scores out of the 20 sub-regions. In another case, the time duration required for re-rendering may be such that only 10 sub-regions can be re-rendered in that time duration. In such a case, the priority order would include only 10 sub-regions having the lowest quality scores out of the 20 sub-regions. It will be appreciated that rendering information for sub-regions that were required to be re-rendered by the rendering server but could not be re-rendered (owing to the aforesaid limitation of the priority order) or whose rendering information could not be received in time for displaying, is optionally derived by the at least one processor from the previous rendering information of their corresponding sub-regions in the at least one previously-presented region.

Optionally, when determining the at least one sub-region of the region to be presented whose rendering information is to be derived from the previous rendering information, the at least one processor is configured to identify the given sub-region as one of the at least one sub-region when the quality score of the given sub-region is above a predefined threshold score. When the quality score of the given sub-region is above the predefined threshold score, it indicates that the rendering information of the given sub-region can be sufficiently derived from the previous rendering information with an acceptable degree of accuracy. Therefore, the given sub-region is identified as one of the at least one sub-region whose rendering information is to be derived from the previous rendering information. Alternatively, when the score of the given sub-region is below or equal to the predefined threshold score, it indicates that the rendering information of the given sub-region cannot be sufficiently derived from the previous rendering information with an acceptable degree of accuracy. Therefore, the given sub-region is not identified as one of the at least one sub-region.

Optionally, when the quality score of the given sub-region lies in a range of 0 to 1, the predefined threshold score is equal to 0.5. Alternatively, optionally, when the quality score of the given sub-region lies in a range of 0 to 100, the predefined threshold score is equal to 50. When the quality score of the given sub-region is also be expressed as a percentage, the predefined threshold score is equal to 50 percent.

As an example, six sub-regions J1, J2, J3, J4, J5 and J6 of the region to be presented may have quality scores 0.25, 0, 0.7, 0.4, 0.9, and 0.3, respectively. The sub-regions J3 and J5 may be determined as the at least one sub-region whose rendering information is to be derived from the previous rendering information, whereas the sub-regions J1, J2, J4, and J6 are required to be re-rendered in the priority order: J2, J1, J6, J4.

The present disclosure also relates to the method as described above. Various embodiments and variants disclosed above apply mutatis mutandis to the method.

Optionally, the display apparatus further comprises means for tracking a user's gaze, and wherein the method further comprises:
 processing gaze-tracking data, collected by the means for tracking the user's gaze, to determine a gaze direction, a gaze velocity and a gaze acceleration per eye of the user;
 predicting a gaze location of the user in the extended-reality environment, based on the gaze direction, the gaze velocity and the gaze acceleration; and
 sending, to the rendering server, gaze information indicative of the predicted gaze location,
wherein the region to be presented is determined based on the predicted gaze location.

Optionally, in the method, the at least one sub-region of the region to be presented whose rendering information is to be derived from the previous rendering information is determined based on the predicted gaze location.

Optionally, the method further comprises computing a quality score for each sub-region of the region to be presented, wherein a quality score is computed for a given sub-region based on whether or not previous rendering information of at least one corresponding sub-region of the at least one previously-presented region is available for the given sub-region.

Optionally, in the method, the quality score is computed for the given sub-region based on a comparison of a resolution required for the given sub-region and a resolution at which the previous rendering information of the at least one corresponding sub-region is available.

Optionally, the method further comprises:
 determining a priority order in which the remaining sub-regions of the region to be presented are required to be re-rendered, based on corresponding quality scores of the remaining sub-regions; and
 sending the priority order to the rendering server,
wherein the rendering information of the remaining sub-regions is received from the rendering server as per the priority order.

Optionally, in the method, the step of determining the at least one sub-region of the region to be presented whose rendering information is to be derived from the previous rendering information comprises identifying the given sub-region as one of the at least one sub-region when the quality score of the given sub-region is above a predefined threshold score.

DETAILED DESCRIPTION OF THE DRAWINGS

Referring to FIG. 1, illustrated is a block diagram of architecture of a display apparatus 100, in accordance with an embodiment of the present disclosure. The display apparatus 100 comprises means 102 for tracking a pose of a user's head, at least one light source per eye (depicted as light sources 104 and 106), and at least one processor (depicted as a processor 108). The at least one processor 108 is communicably coupled to the means 102 for tracking the pose of the user's head, and the light sources 104 and 106. The processor 108 is also coupled to a rendering server 110.

Figure 2:
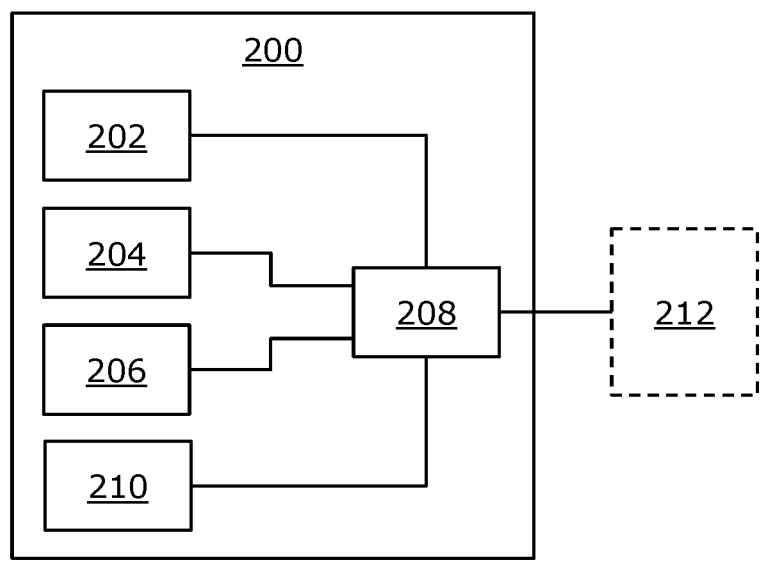

Referring to FIG. 2, illustrated is a block diagram of architecture of a display apparatus 200, in accordance with another embodiment of the present disclosure. The display apparatus 200 comprises means 202 for tracking a pose of a user's head, at least one light source per eye (depicted as light sources 204 and 206), at least one processor (depicted as a processor 208), and means 210 for tracking the user's gaze. The processor 208 is communicably coupled to the means 202 for tracking the pose of the user's head, the light sources 204 and 206, and the means 210 for tracking the user's gaze. The processor 208 is also coupled to a rendering server 212.

It may be understood by a person skilled in the art that FIG. 1 and FIG. 2 include simplified architectures of the display apparatuses 100 and 200, respectively, for sake of clarity, which should not unduly limit the scope of the claims herein. The person skilled in the art will recognize many variations, alternatives, and modifications of embodiments of the present disclosure.

Figure 3A:
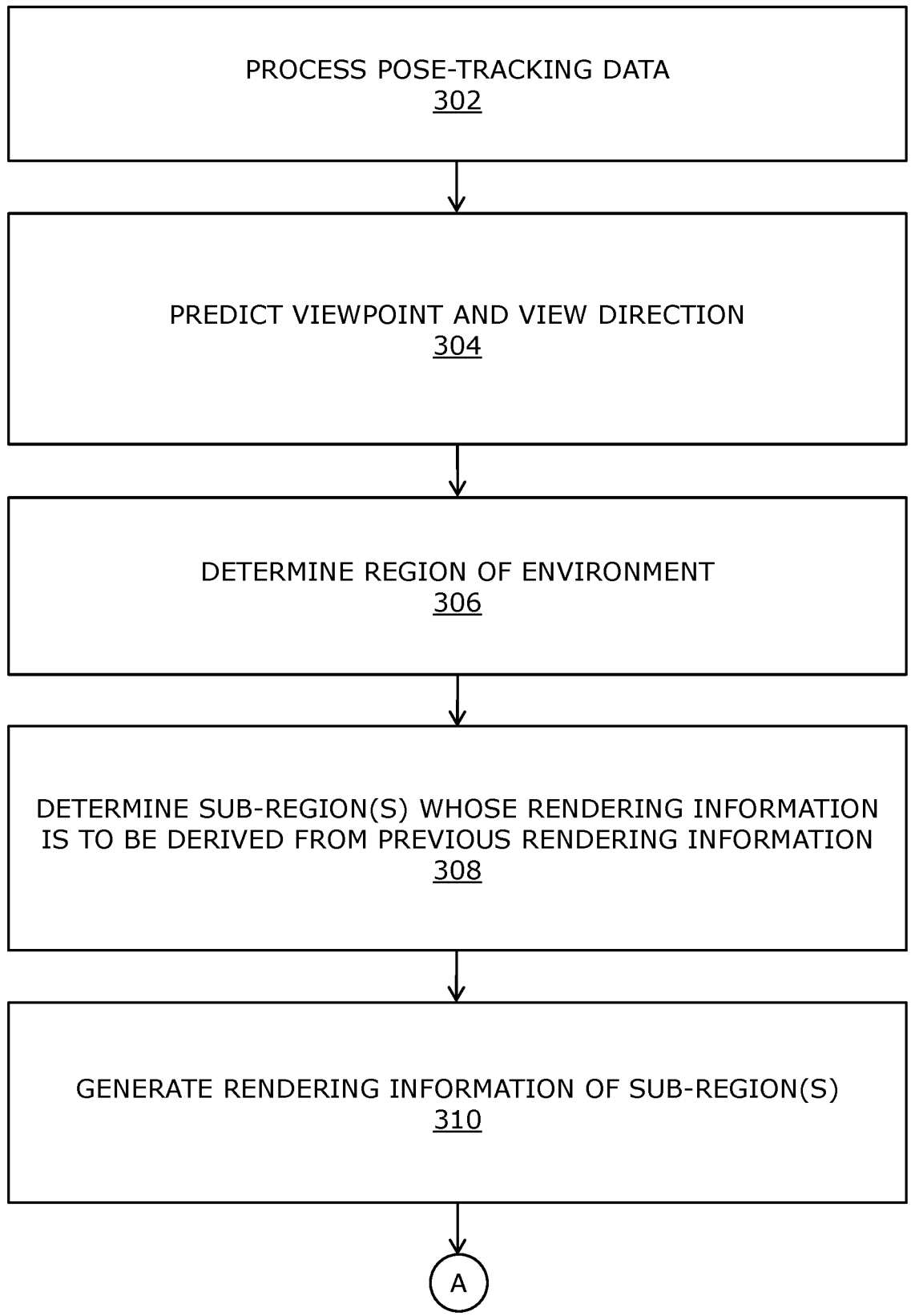
FIGS. 3A and 3B illustrate steps of a method of displaying, in accordance with an embodiment of the present disclosure.
Figure 3B:
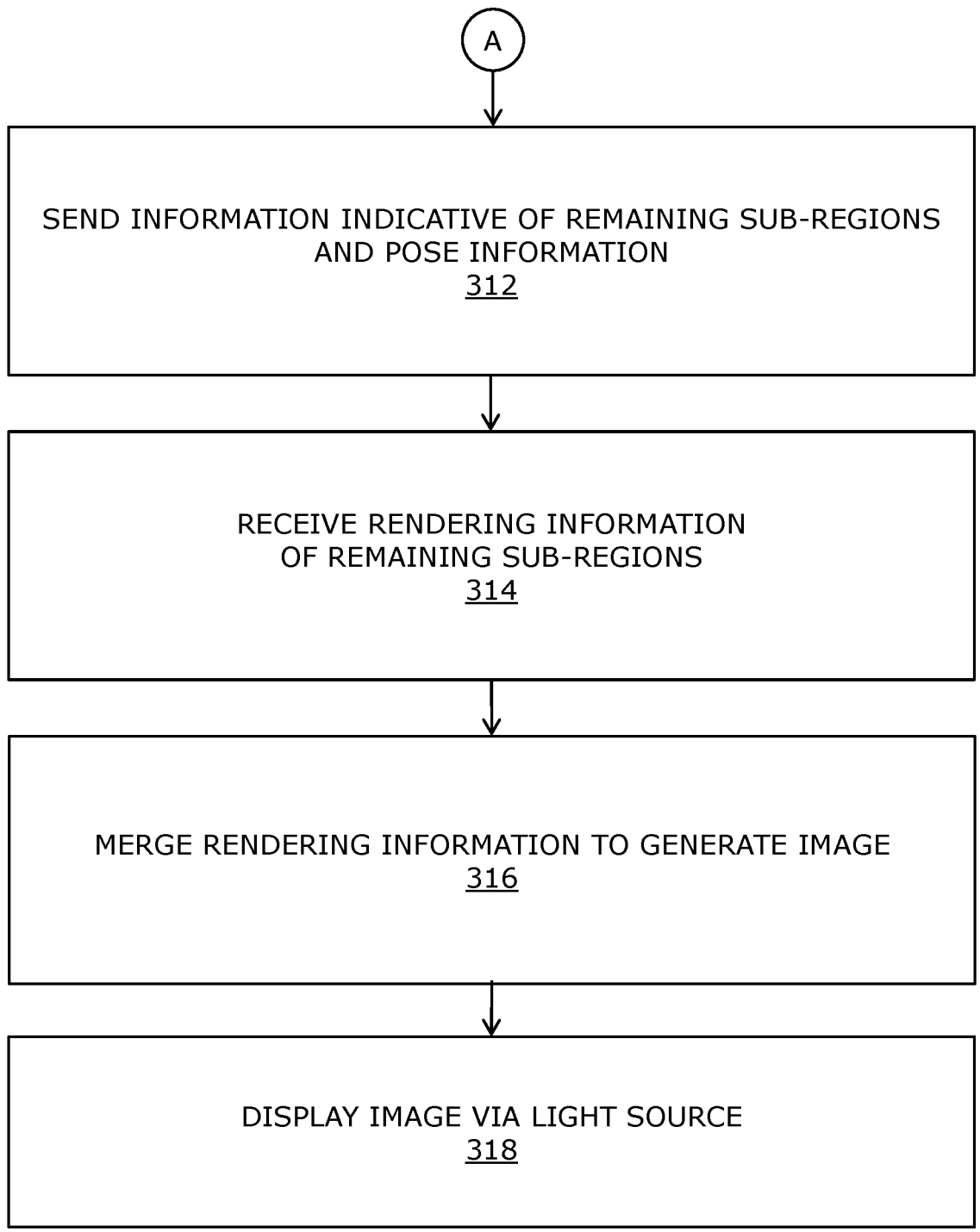

Referring to FIGS. 3A and 3B, illustrated are steps of a method of displaying, in accordance with an embodiment of the present disclosure. The method is implemented via a display apparatus comprising means for tracking a pose of a user's head and at least one light source per eye. At step 302, pose-tracking data, collected by said means, is processed to determine a position, an orientation, a velocity and an acceleration of the user's head. At step 304, a viewpoint and a view direction of the user in an extended-reality environment is predicted, based on the position, the orientation, the velocity and the acceleration of the user's head. At step 306, a region of the extended-reality environment that is to be presented to the user is determined, based on the predicted viewpoint and the predicted view direction of the user. At step 308, at least one sub-region of the region to be presented, whose rendering information is to be derived from previous rendering information of at least one corresponding sub-region of at least one previously-presented region of the extended-reality environment, is determined. At step 310, the rendering information of the at least one sub-region is generated, based on the previous rendering information. At step 312, information indicative of remaining sub-regions of the region to be presented that are required to be re-rendered and pose information indicative of the predicted viewpoint and the predicted view direction of the user are sent to a rendering server. At step 314, rendering information of the remaining sub-regions of the region to be presented is received, from the rendering server. At step 316, the rendering information of the at least one sub-region and the rendering information of the remaining sub-regions is merged, to generate at least one image. At step 318, the at least one image is displayed via the at least one light source.

The steps 302, 304, 306, 308, 310, 312, 314, 316, and 318 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
   means for tracking a pose of a user's head;
   at least one light source per eye; and
   at least one processor configured to:
   process pose-tracking data, collected by said means, to determine a position, an orientation, a velocity and an acceleration of the user's head;
   predict a viewpoint and a view direction of the user in an extended-reality environment, based on the position, the orientation, the velocity and the acceleration of the user's head;
   determine a region of the extended-reality environment that is to be presented to the user, based on the predicted viewpoint and the predicted view direction of the user;
   determine at least one sub-region of the region to be presented whose rendering information is to be reused from previous rendering information of at least one corresponding sub-region of at least one previously-presented region of the extended-reality environment;
   generate the rendering information of the at least one sub-region based on the previous rendering information;
   send, to a rendering server, information indicative of remaining sub-regions of the region to be presented that have a required resolution greater than the resolution of the remaining sub region's previous rendering information and are required to be re-rendered by the rendering server, the information indicative of the remaining sub-regions including pose information indicative of the predicted viewpoint and the predicted view direction of the user;
   receive, from the rendering server, rendering information of the re-rendered remaining sub-regions of the region to be presented;
   merge the rendering information of the at least one sub-region and the rendering information of the remaining sub-regions to generate at least one image; and
   display the at least one image via the at least one light source.

2. The display apparatus of claim 1, further comprising means for tracking a user's gaze, wherein the at least one processor is configured to:
   process gaze-tracking data, collected by the means for tracking the user's gaze, to determine a gaze direction, a gaze velocity and a gaze acceleration per eye of the user;
   predict a gaze location of the user in the extended-reality environment, based on the gaze direction, the gaze velocity and the gaze acceleration; and
   send, to the rendering server, gaze information indicative of the predicted gaze location,
   wherein the region to be presented is determined based on the predicted gaze location.

3. The display apparatus of claim 2, wherein the at least one sub-region of the region to be presented whose rendering information is to be derived from the previous rendering information is determined based on the predicted gaze location.

4. The display apparatus of claim 1, wherein the at least one processor is configured to compute a quality score for each sub-region of the region to be presented, wherein a quality score is computed for a given sub-region based on whether or not previous rendering information of at least one corresponding sub-region of the at least one previously-presented region is available for the given sub-region.

5. The display apparatus of claim 4, wherein the quality score is computed for the given sub-region based on a comparison of a resolution required for the given sub-region and a resolution at which the previous rendering information of the at least one corresponding sub-region is available.

6. The display apparatus of claim 4, wherein the at least one processor is configured to:
   determine a priority order in which the remaining sub-regions of the region to be presented are required to be re-rendered, based on corresponding quality scores of the remaining sub-regions; and
   send the priority order to the rendering server,
   wherein the rendering information of the remaining sub-regions is received from the rendering server as per the priority order.

7. The display apparatus of claim 4, wherein, when determining the at least one sub-region of the region to be presented whose rendering information is to be derived from the previous rendering information, the at least one processor is configured to identify the given sub-region as one of the at least one sub-region when the quality score of the given sub-region is above a predefined threshold score.

8. A method of displaying, the method being implemented via a display apparatus comprising means for tracking a pose of a user's head and at least one light source per eye, the method comprising:
   processing pose-tracking data, collected by said means, to determine a position, an orientation, a velocity and an acceleration of the user's head;

predicting a viewpoint and a view direction of the user in an extended-reality environment, based on the position, the orientation, the velocity and the acceleration of the user's head;

determining a region of the extended-reality environment that is to be presented to the user, based on the predicted viewpoint and the predicted view direction of the user;

determining at least one sub-region of the region to be presented whose rendering information is to be reused from previous rendering information of at least one corresponding sub-region of at least one previously-presented region of the extended-reality environment;

generating the rendering information of the at least one sub-region based on the previous rendering information;

sending, to a rendering server, information indicative of remaining sub-regions of the region to be presented that have a required resolution greater than the resolution of the remaining sub region's previous rendering information and are required to be re-rendered by the rendering server, the information indicative of the remaining sub-regions including pose information indicative of the predicted viewpoint and the predicted view direction of the user;

receiving, from the rendering server, rendering information of the re-rendered remaining sub-regions of the region to be presented;

merging the rendering information of the at least one sub-region and the rendering information of the remaining sub-regions to generate at least one image; and displaying the at least one image via the at least one light source.

9. The method of claim 8, wherein the display apparatus further comprises means for tracking a user's gaze, and wherein the method further comprises:

processing gaze-tracking data, collected by the means for tracking the user's gaze, to determine a gaze direction, a gaze velocity and a gaze acceleration per eye of the user;

predicting a gaze location of the user in the extended-reality environment, based on the gaze direction, the gaze velocity and the gaze acceleration; and sending, to the rendering server, gaze information indicative of the predicted gaze location, wherein the region to be presented is determined based on the predicted gaze location.

10. The method of claim 9, wherein the at least one sub-region of the region to be presented whose rendering information is to be derived from the previous rendering information is determined based on the predicted gaze location.

11. The method of claim 8, further comprising computing a quality score for each sub-region of the region to be presented, wherein a quality score is computed for a given sub-region based on whether or not previous rendering information of at least one corresponding sub-region of the at least one previously-presented region is available for the given sub-region.

12. The method of claim 11, wherein the quality score is computed for the given sub-region based on a comparison of a resolution required for the given sub-region and a resolution at which the previous rendering information of the at least one corresponding sub-region is available.

13. The method of claim 11, further comprising:

determining a priority order in which the remaining sub-regions of the region to be presented are required to be re-rendered, based on corresponding quality scores of the remaining sub-regions; and sending the priority order to the rendering server, wherein the rendering information of the remaining sub-regions is received from the rendering server as per the priority order.

14. The method of claim 11, wherein the step of determining the at least one sub-region of the region to be presented whose rendering information is to be derived from the previous rendering information comprises identifying the given sub-region as one of the at least one sub-region when the quality score of the given sub-region is above a predefined threshold score.

* * * * *